June 19, 1956 A. J. G. BAUDOU 2,750,629
DEVICE FOR THE MANUFACTURE OF MOLDED RUBBER
BOOTS AND SIMILAR ARTICLES
Filed May 14, 1952
Fig. 1.
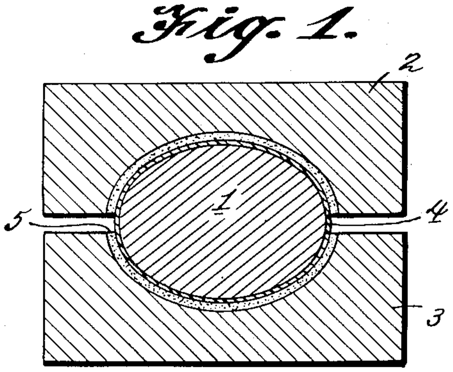
Fig. 2.
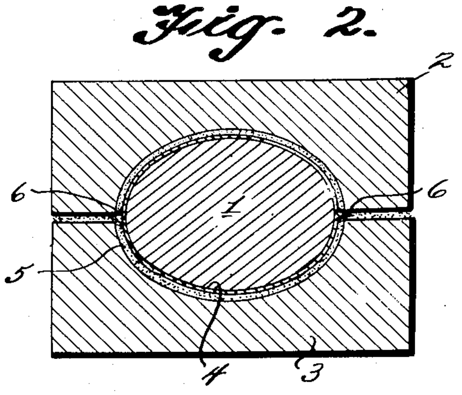
Fig. 3.
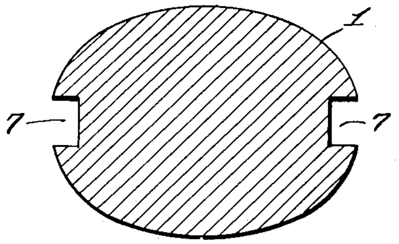
Fig. 4.
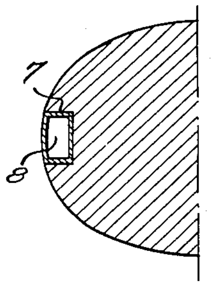
Fig. 5.
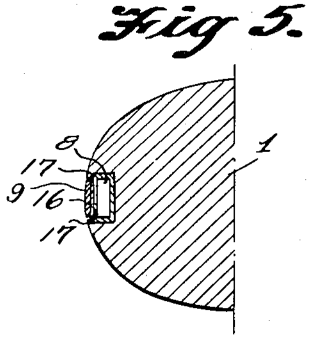
Fig. 6.
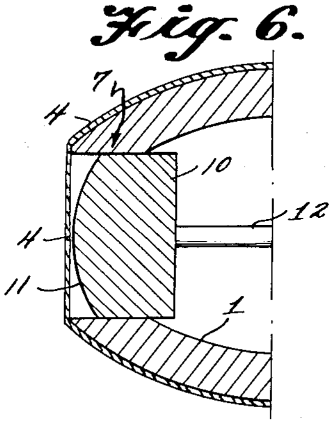
Fig. 7.
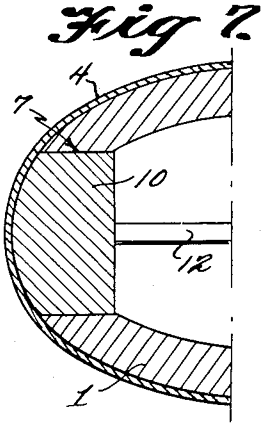
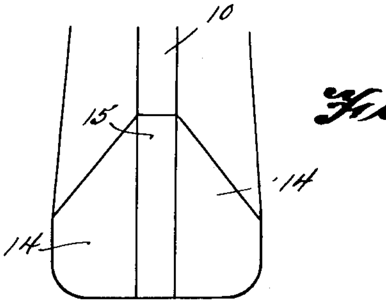
Fig. 8.
INVENTOR
ANTOINE JOSEPH GEORGES BAUDOU
BY Young, Emery & Thompson
ATTORNEYS

United States Patent Office 2,750,629

Patented June 19, 1956

1

2,750,629

DEVICE FOR THE MANUFACTURE OF MOLDED RUBBER BOOTS AND SIMILAR ARTICLES

Antoine Joseph Georges Baudou, Les Eglisottes, France

Application May 14, 1952, Serial No. 287,675

Claims priority, application France May 21, 1951

4 Claims. (Cl. 18—45)

It is already known to manufacture molded articles embodying inlaid fabric portions such as rubber footwear and particularly rubber boots by means of a piece of fabric applied on a metal core contained in a mold made up of a pair of companion shells, said piece of fabric being then covered with a layer of rubber, whereupon a strong pressure is exerted upon the assembly during the vulcanization of the rubber.

However it has been found that during the last-named operation and due to the strong pressure exerted upon the mold, the piece of fabric is frequently dragged along by the rubber as the latter tends to escape through the junctions between the two companion shells which make up the mold so that said fabric is then pinched between the edges of the shells and thus prevents the corresponding portions of the rubber blank from being properly interwelded. As a result of this, the article when demolded is found to present cracks or flaws over a substantial portion of its height along the junction line of its two parts.

It is an object of the present invention to provide a device adapted to stave off the risk of the piece of fabric being dragged along by the rubber as above stated when the two companion shells of the mold are brought together and the mold is closed down under pressure, said device permitting the two rubber portions of the article such as a rubber boot having inlaid or imbedded fabric to be securely and efficiently interwelded along the junction line of the two shells.

Another object of the invention is to provide a device as aforesaid utilizing a mold constituted as usual in this art that is to say made up of a pair of companion rigid shells but incorporating as a novel element a hard core advantageously made of metal provided over a portion of its periphery and at least on one side of its transverse axis i. e. of the line defining the junction plane of said metal shells a suitably shaped groove, recess or mortise containing a filler member having a cross sectional area slightly smaller than that of the mortise and associated with means for being brought (preliminarily to the vulcanization process) to a condition in which a portion of its periphery merges with and completes the outline of the mold, thereby to stretch the fabric applied upon said core into rubber-fitting position while precluding pinching of said fabric.

A further object of the invention is to provide a rubber boot manufacturing device as aforesaid comprising a pair of companion rigid metal shells and a metal hard core having at least one groove or mortise each containing a filler member constituted by a movable metal bar associated with actuating means including one or several rods or links by which it can be urged outwards of the mortise to fabric-stretching position, the several positions that may be assumed by said filler bar being advantageously obtained by means of a hydraulic jacking contrivance operatively connected to said bar by a mechanically actuated rod.

A still further object of the invention is to provide an improved device as aforesaid wherein the filler member or members may comprise inflatable bladder elements or "air bags" the inflation of which is effected before the mold is closed under pressure, the shape of these air bags being such that after being inflated they substantially fill up the recesses or mortises which contain them and complete the outline of the core, thus stretching the fabric which is laid upon said core and ensuring adequate imbedding of said fabric in the surrounding rubber mass which is to form the boot or similar article.

With these and such other objects in view as will incidentally appear hereafter, the invention comprises the novel construction and combination of parts that make up the aforesaid device and that will now be described with reference to the accompanying diagrammatic drawing exemplifying the same and forming a part of the present disclosure.

In the drawing:

Fig. 1 is a transverse sectional view of a mold made up of two shells of usual type utilizable for the production of rubber boots having a fabric lining.

Fig. 2 is a sectional view similar to Fig. 1 showing said mold as the shells are brought together during the vulcanizing operation.

Fig. 3 is a sectional view drawn to a larger scale showing a metal core for a mold according to the invention, said core having oppositely located grooves or mortises arranged symmetrically to its transverse axis.

Fig. 4 is a fragmentary sectional view of the metal core as shown in Fig. 3 but showing a filler body or member movably arranged in the mortise and constituted by an inflatable air bag.

Fig. 5 is a fragmentary sectional view similar to Fig. 4 showing a modificaton of the filler body or member in which it is provided with a tongue element.

Figs. 6 and 7 are fragmentary sectional views similar to Figs. 4 and 5 but drawn to a larger scale and showing further constructional modifications, these showings being taken during two successive phases of the shaping operation with the fabric applied upon the core, the filler member accommodated in the mortise provided in the fabric-supporting core being constituted in these instances by a mechanically actuated movable bar.

Fig. 8 is a fragmentary diagrammatic view of a core comprising a retractable heel portion.

Like reference numerals designate like parts throughout the several views.

Reference being first had to Fig. 1 which, as above stated, shows a mold of usual shape utilizable for example for making rubber boots or similar articles comprising an inlaid fabric, it will be seen that this mold comprises a hard core 1 advantageously made of a suitable metal or alloy having a substantially elliptical cross section, said core being solid or hollow depending upon practical requirements, and a pair of companion shells 2, 3. These shells are shown in Fig. 1 as being partly closed but prior to being subjected to the shaping pressure due to the closing of the mold. As shown, the hard core 1 is surrounded by a piece of suitable fabric 4 covered with a layer of rubber 5 having suitable thickness. As the pressure resulting from the closing of the mold is being exerted and during the vulcanizing operation, the fabric 4 is usually dragged along by the adjacent layer of rubber into the junction spaces of the two shells 2 and 3 (as shown at 6 in Fig. 2) and consequently prevents the two rubber portions from becoming interwelded.

This prevention of an interwelding of the two rubber portions of the blank in the usual art constitutes a serious disadvantage which the invention aims at avoiding. To that effect, the hard core shown separately in Fig. 3 is provided with one or several grooves, recesses, or mortises 7 which, in the embodiment as shown, extend on the opposite sides of its transverse axis. In other words, in this constructional form, the core 1 is provided with a pair of oppositely located grooves or mortises 7. The purpose of these mortises 7 is to receive inflatable bladder-like elements or air bags 8 (Fig. 4) which, when swollen up, assume proper shape for merging with and completing the outline of the core 1 and when deflated collapse to such a position as will enable the piece of fabric (not shown in Figs. 4 and 5) having a peripheral length slightly smaller than that of the core to be engaged over said core, whereafter the air bag or each air bag is inflated so as to stretch said fabric which thus tightly surrounds the core.

The shape of the air bag 8 is such that, when properly inflated to the required degree, it merges with the outline of the metal core 1 and completes said outline which, in this instance, is elliptical, thereby stretching the fabric cladding thereover. The bladder or air bag 8 may be fitted with a metal tongue element 9 (as shown in Fig. 5) adapted, when the air bag is inflated, more accurately to complete the contour of the core 1 and to stretch the fabric into rubber-fitting contact under better operating conditions, the shoulders 16 of said tongue members 9 abutting upon the edges 17 of the mortises 7.

In the constructional modification illustrated in Figs. 6 and 7, the filler member is constituted by a movable rigid bar 10 (advantageously made of a suitable metal or alloy) having a cross sectional area slightly smaller than that of the mortise 7 which enables said filler member to be shifted sidewise in said mortise for example from the retracted position shown in Fig. 6 to the extended position shown in Fig. 7. The movable bar 10 has on its outer face such a convexity as to merge with and complete the elliptical outline of the core 1 when in extended position, thereby stretching the fabric 4 into rubber-fitting condition.

The operational motion of the filler member 10 may be advantageously performed by jacking or pushing means (not shown) operatively connected to said filler member by means of a transmission mechanism or gear. A link 12 operatively connected to the movable bar 10 is provided for transmitting to the latter the impulse of the jacking means. The latter may have any approved construction and may comprise for example a ram movable in a tight cylinder receiving the motive fluid through a suitable piping passing through the core wall.

It will be seen from Fig. 6 which shows the bar 10 in retracted position that the fabric 4 which surrounds the core 1 is not yet stretched opposite the mortise 7. It is this retracted position of, the filler member 10 in the mortise 7 which permits the fabric 4 to be engaged over the core 1 although said fabric has an overall size slightly smaller than the elliptical outline of the core including the bars 10 when in extended positions.

As the bar or each bar 10 is moved outwardly to its extended position (as shown by Fig. 7) the fabric 4 is strongly stretched around the core, whereupon the molding of the rubber boot or similar article can be continued and brought to its conclusion as under customary practice without any risk of the fabric 4 becoming pinched in the junction nip between the peripheral edges of the shells 2, 3 as the latter are closed down.

Where an extensible fabric is used for constituting the inner lining or inlay of a rubber boot or similar article, the application of the fabric and the demolding of the finished article offer no difficulty whatever and may be conducted easily and conveniently.

Where conversely a non-extensible or stiff fabric is used, the metal core 1 as above described may be advantageously provided with a retractable heel portion made up of three parts, namely a pair of side parts 14 and a middle part 15 as shown by Fig. 8. This permits the fabric such as 4 to be laid, prior to the molding operation, upon the core 1, also to demold the rubber boot after completion of the shaping and curing steps without difficulties. Between the two side parts 14 of the heel portion of the core is interposed and intermediate or middle part 15 aligned with the bar 10 and operating in the same manner. Retraction of the heel portion 14—15 for example to bring it back to its normal position is effected for example by hydraulic jacking means constructed as above described.

It will be observed from an examination of Figs. 6 and 7 that the core 1 is hollow and that the mortise 7 communicates with the inside of the core. This arrangement is not limitative since the inside of the hollow core might not be in communication with the mortise 7, a partition then separating the two spaces from each other.

It will be understood that while the showings only illustrate one mortise 7 and one filler member in each instance, there may be a similar mortise each containing its own filler member on each side i. e. at each end of the major axis of the elliptical or similarly shaped core 1 and that the filler members may comprise rigid bars and/or inflatable bags and/or movable adjunctive tongue elements.

Minor constructional details may be varied without departing from the scope of the subjoined claims.

What is claimed is:

1. A device for the manufacture of molded rubber boots and similar articles having fabric lining comprising a mold of elliptical shaped cross section made up of a pair of companion relatively movable rigid shells separable along a plane containing the major axis of the elliptical cross section for receiving the rubber to be cured and a fabric-supporting hard core located within said mold, said companion shells defining at their junction plane a separation line and being subjected during the curing treatment to a pressure relatively moving said shells towards each other so as to press the rubber material between said shells and the core, said core being of elliptical shape in cross section and having on at least one portion of its surface adjacent and coextensive with a line defining the junction plane of said shells a mortise, a filler loosely accommodated in said mortise and having substantially the same cross sectional area but slightly smaller than that of the mortise, and actuating means for bringing said filler to a condition in which a portion of its periphery merges with and completes the outline of the core, thereby to stretch the fabric applied upon said core when the filler is retracted into rubber-fitting position.

2. A device as set forth in claim 1 wherein the filler includes a movable rigid bar loosely accommodated in said mortise and wherein the actuating means includes linking and jacking means for bringing the filler bar to a position so as to complete the elliptical outline of the core.

3. A device as set forth in claim 1 wherein the filler comprises an inflatable air bag loosely accommodated in said mortise and wherein the actuating means includes an inflator system for swelling said air bag to a position in which a portion of the periphery of the bag will complete the elliptical outline of the core.

4. A device as set forth in claim 3, wherein the air bag is provided on its outward face with a rigid tongue element and when said bag is actuated said tongue element is brought to a position to complete the outline of the core thereby stretching the fabric lining into rubber-filling condition.

References Cited in the file of this patent

UNITED STATES PATENTS

| | | |
|---|---|---|
| 789,562 | Polk | May 9, 1905 |
| 1,126,853 | Peterson | Feb. 2, 1915 |
| 1,270,886 | Siptrott | July 2, 1918 |
| 1,445,939 | Flynn | Feb. 20, 1923 |
| 1,488,075 | Taylor | Mar. 24, 1924 |
| 1,676,325 | Doll | July 10, 1928 |
| 2,315,634 | McCall | Apr. 6, 1943 |
| 2,472,068 | Farley | June 7, 1949 |

FOREIGN PATENTS

| | | |
|---|---|---|
| 16,763 | Norway | Sept. 2, 1907 |
| 159,209 | Great Britain | Apr. 6, 1922 |